US010860175B2

(12) United States Patent
Gupta et al.

(10) Patent No.: US 10,860,175 B2
(45) Date of Patent: Dec. 8, 2020

(54) DYNAMICALLY GENERATING CUSTOM SETS OF APPLICATION SETTINGS

(71) Applicant: Google Inc., Mountain View, CA (US)

(72) Inventors: Malhar Gupta, San Jose, CA (US); Karen Vertierra, San Jose, CA (US); Roee Livne, Sunnyvale, CA (US); Neel Rao, San Francisco, CA (US); Courtney Caldwell, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 351 days.

(21) Appl. No.: 15/395,217

(22) Filed: Dec. 30, 2016

(65) Prior Publication Data

US 2018/0188900 A1 Jul. 5, 2018

(51) Int. Cl.
*G06F 3/0482* (2013.01)
*G06F 3/0484* (2013.01)
*G09G 5/32* (2006.01)
*G06F 9/451* (2018.01)

(52) U.S. Cl.
CPC ........ *G06F 3/0482* (2013.01); *G06F 3/04847* (2013.01); *G06F 9/451* (2018.02); *G09G 5/32* (2013.01)

(58) Field of Classification Search
CPC ...... G06F 3/0482; G06F 3/04847; G09G 5/32
See application file for complete search history.

(56) References Cited

U.S. PATENT DOCUMENTS

| 2013/0061259 A1* | 3/2013 | Raman ............... H04H 60/32 725/14 |
| 2013/0096819 A1 | 4/2013 | Tarnok |

(Continued)

FOREIGN PATENT DOCUMENTS

| CN | 102880395 | 1/2013 |
| CN | 103092471 | 5/2013 |

OTHER PUBLICATIONS

Ginsburg, "Self-adapting menus for CAD software", Computers and Structures., vol. 23, No. 4, published: Jul. 23, 1985, pp. 475-479, XP055432794, GB ISSN: 0045-7949/86 (Year: 1985).*

(Continued)

*Primary Examiner* — Seth A Silverman
(74) *Attorney, Agent, or Firm* — Middleton Reutlinger

(57) ABSTRACT

A method includes determining, by an application executing at a computing device, based at least in part on a respective amount of usage of each settings category from a plurality of settings categories, a respective relevancy score for the corresponding settings category. The method also includes determining, by the application, based on the respective relevancy scores, a respective display position for each settings category within an application settings graphical user interface. The method further includes, responsive to determining a display position of each settings category, generating, by the application, based on the display positions of each settings category, the application settings graphical user interface including a respective representation of at least one settings category in the plurality of settings categories at the corresponding display position. The method also includes outputting, by the application, for display at a display device, an indication of the application settings graphical user interface.

19 Claims, 5 Drawing Sheets

(56) References Cited

U.S. PATENT DOCUMENTS

2014/0181650 A1* 6/2014 Polubinski ............ G06F 3/0482
715/702
2014/0279391 A1* 9/2014 Gallo ................... G06Q 40/025
705/38
2015/0195179 A1* 7/2015 Skare ........................ G06F 8/71
715/745

OTHER PUBLICATIONS

Kishore, "How to Customize the Ribbon in MS Office", published: Oct. 27, 2010, HelpDeskGeek.com, https://helpdeskgeek.com/office-tips/customize-the-ribbon-in-ms-office/ (Year: 2010).*

Ginsburg, S., "Self-adapting menus for CAD software", Computers and Structures, vol. 23, No. 4, pp. 475-479, XP055432794, GB; ISSN: 0045-7949, DOI: 10.1016/0045-7949 (86) 90090-8; Jul. 23, 1986.

European Patent Office; International Search Report and Written Opinion of PCT Ser. No. PCT/US2017/054151, dated Dec. 15, 2017; 10 pages.

United Kingdom Intellectual Property Office; Combined Search and Examination Report issued in Application No. 1715740.5 dated Mar. 7, 2018.

United Kingdom Intellectual Property Office; Combined Search and Examination Report issued in Application No. 1715740.5 dated Dec. 20, 2019.

China National Intellectual Property Administration, First Office Action issued in Application No. 201710908516.X; 36 pages; dated Aug. 18, 2020.

* cited by examiner

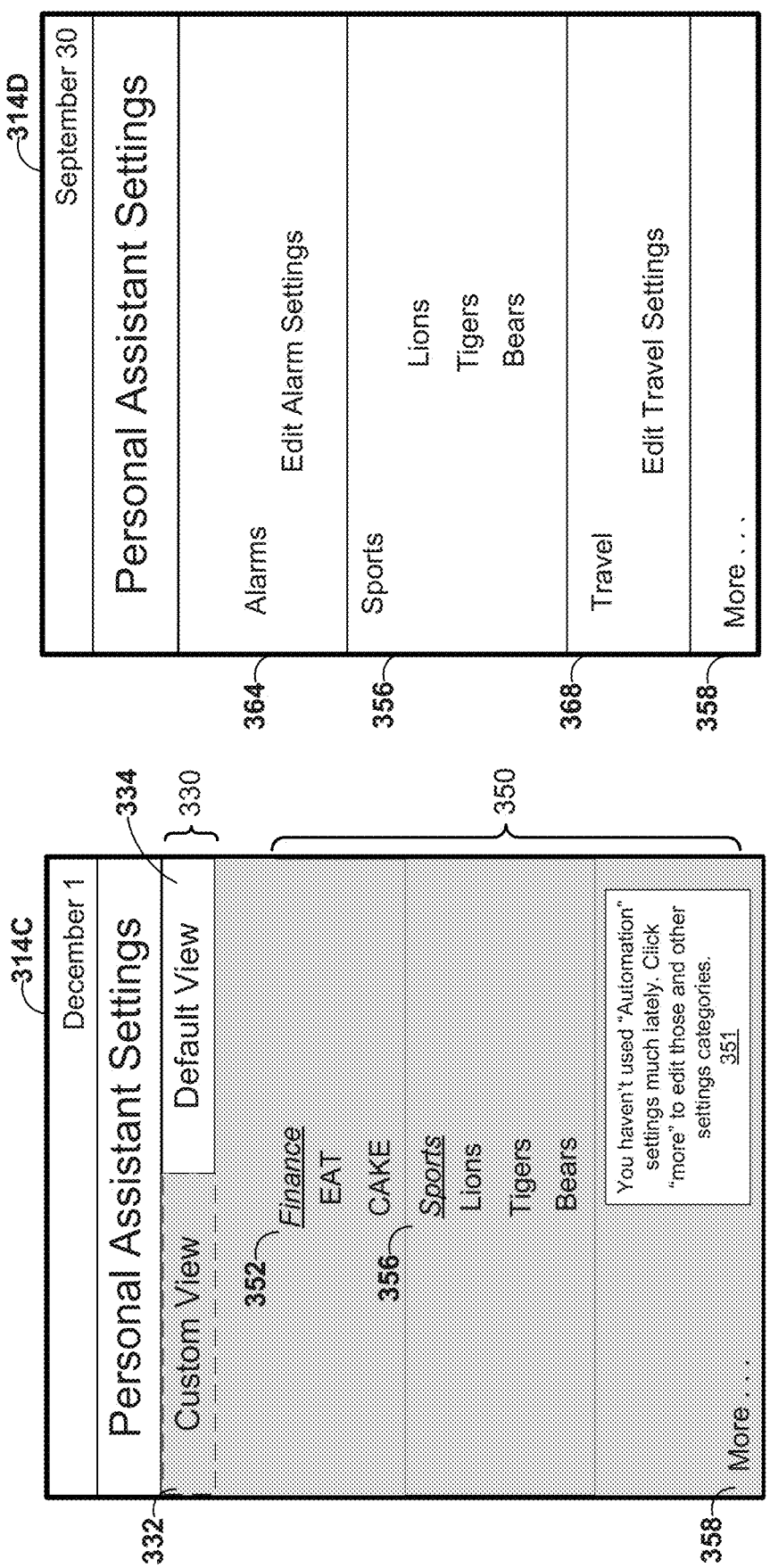

DYNAMICALLY GENERATING CUSTOM SETS OF APPLICATION SETTINGS

BACKGROUND

Some computing devices e.g., mobile phones, tablet computers, computerized watches, etc.) may come with applications pre-installed or may allow users to install applications from an application repository. Some applications may enable a user to change various application settings. Such applications may output a list of applications settings to enable the user to edit various settings. The list of application settings may be the same for all users of the application.

SUMMARY

The disclosed subject matter relates to particular techniques for dynamically generating and displaying custom groups of application settings. An application executing at a computing device may determine which settings from a group of application settings that a user of the application is most likely to select based on information associated with a user of the computing device. The information may only be used by the computing device in instances where the user provides explicit authorization for the computing device to access and utilize such information. In response to determining the settings that are most likely to be selected, the application may generate a custom graphical user interface that displays the settings most likely to be selected more prominently than other settings. In this way, techniques of this disclosure may provide a group of settings that are individually tailored to the user of the device. The techniques of the disclosure may automatically and dynamically enable the settings most likely to be selected by the user to be displayed in a more prominent position and save the user from having each time to manually browse through all the settings and select the settings of interest. This helps to simplify the user interface. Such simplification is particularly useful and beneficial on computing devices, such as mobile or portable devices, that typically have limited display size and/or user interaction.

In one example, a method includes determining, by an application executing at a computing device, based at least in part on a respective amount of usage of each settings category from a plurality of settings categories, a respective relevancy score for the corresponding settings category. Each respective relevancy score is indicative of a probability that a user will select the corresponding settings category. The method includes determining, by the application, based on the respective relevancy scores, a respective display position for each settings category within an application settings graphical user interface. The method also includes, responsive to determining a display position of each settings category, generating, by the application, based on the display positions of each settings category, the application settings graphical user interface including a respective representation of at least one settings category in the plurality of settings categories at the corresponding display position. The method further includes outputting, by the application, for display at a display device, an indication of the application settings graphical user interface.

In another example, a computing device includes at least one processor; and a memory. The memory includes instructions that, when executed by the at least one processor, cause the at least one processor to determine, based at least in part on a respective amount of usage of each settings category from a plurality of settings categories, a respective relevancy score for the corresponding settings category, wherein each respective relevancy score is indicative of a probability that a user will select the corresponding settings category. The memory includes instructions that, when executed by the at least one processor, cause the at least one processor to determine, based on the respective relevancy scores, a respective display position for each settings category within an application settings graphical user interface. The method includes additional instructions that, when executed by the at least one processor, cause the at least one processor to responsive to determining a display position of each settings category, generate, based on the display positions of each settings category, the application settings graphical user interface including a respective representation of at least one settings category in the plurality of settings categories at the corresponding display position. The memory includes further instructions that, when executed by the at least one processor, cause the at least one processor to output, for display at a display device, an indication of the application settings graphical user interface.

In another example, a computer-readable storage medium includes instructions that, when executed by at least one processor of a computing device, cause the at least one processor to determine, based at least in part on a respective amount of usage of each settings category from a plurality of settings categories, a respective relevancy score for the corresponding settings category. Each respective relevancy score is indicative of a probability that a user will select the corresponding settings category. The computer-readable storage medium includes instructions that, when executed by at least one processor of a computing device, cause the at least one processor to determine, based on the respective relevancy scores, a respective display position for each settings category within an application settings graphical user interface. The computer-readable storage medium also includes instructions that, when executed by at least one processor of a computing device, cause the at least one processor to, responsive to determining a display position of each settings category, generate, based on the display positions of each settings category, the application settings graphical user interface including a respective representation of at least one settings category in the plurality of settings categories at the corresponding display position. The computer-readable storage medium further includes instructions that, when executed by at least one processor of a computing device, cause the at least one processor to output, for display at a display device, an indication of the application settings graphical user interface.

In another example, a system that includes means for determining, based at least in part on a respective amount of usage of each settings category from a plurality of settings categories, a respective relevancy score for the corresponding settings category. Each respective relevancy score is indicative of a probability that a user will select the corresponding settings category. The system includes means for determining, based on the respective relevancy scores, a respective display position for each settings category within an application settings graphical user interface. The system also includes, responsive to determining a display position of each settings category, means for generating, based on the display positions of each settings category, the application settings graphical user interface including a respective representation of at least one settings category in the plurality of settings categories at the corresponding display position. The system further includes means for outputting, for display at a display device, an indication of the application settings graphical user interface.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 3A-3D are conceptual diagrams illustrating example graphical user interfaces that include custom groups of application settings, in accordance with one or more aspects of the present disclosure.

DETAILED DESCRIPTION

Figure 1:
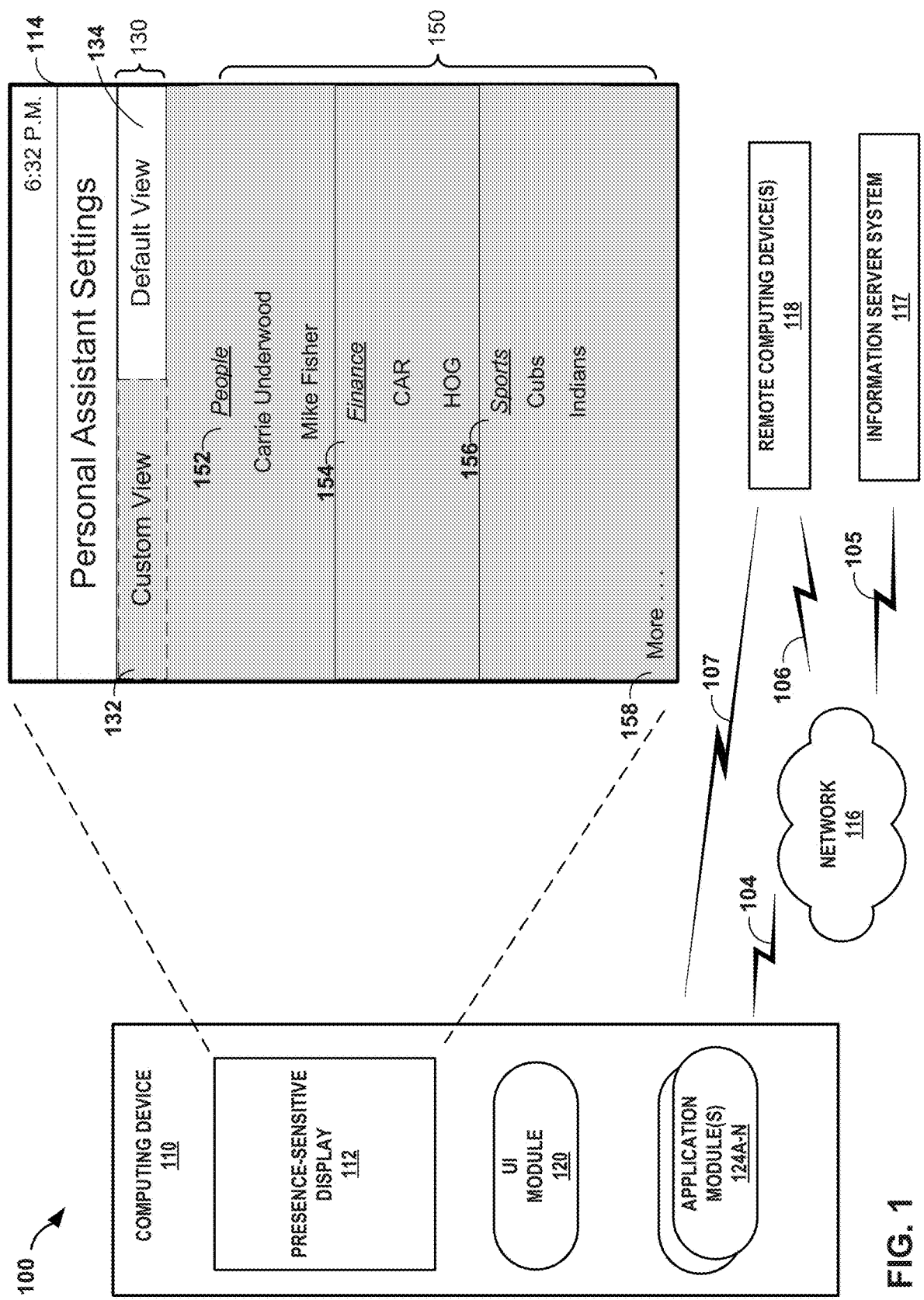
FIG. 1 is a conceptual diagram illustrating an example system that dynamically generates and displays customized groups of application settings, in accordance with one or more aspects of the present disclosure.

FIG. 1 is a conceptual diagram illustrating an example system for presenting a graphical user interface representing an alternative application, in accordance with one or more aspects of the present disclosure. System 100 may include computing device 110, information server system (ISS) 117, and one or more remote computing device 118 that are communicatively coupled via network 116.

Remote computing devices 118 are one example of a computing device, such as a smartphone, a computerized wearable device (e.g., a watch, eyewear, ring, necklace, etc.), speaker, television, automobile head unit (e.g., an "infotainment" system), or any other type of computing device configured to send and receive information via a network, such as network 116. Remote computing device 118 may include one or more applications such as media applications (e.g., music, video, or the like), messaging applications (e.g., email, text, or the like), or any other type of application. Remote computing device 118 may exchange information with computing device 110 via network 116. For example, remote computing device 118 may send information to computing device 110 and may receive information from computing device 110. Remote computing device 118 may also exchange information with computing device 110 without traversing network 116, for example, using direct link 107. Direct link 107 may be any communication protocol or mechanism capable of enabling two computing devices to communicate directly (i.e., without requiring a network switch, hub, or other intermediary network device), such as Bluetooth®, Wi-Fi Direct®, near-field communication, etc.

ISS 117 represents any suitable remote computing system, such as one or more desktop computers, laptop computers, mainframes, servers, cloud computing systems, etc. capable of sending and receiving information via a network, such as network 116, ISS 117 may host applications and data for contextual information, music, weather information, traffic information, messaging information (e.g., email, text messages), calendar information, social media, news information, etc. ISS 117 may represent a cloud computing system that provides information through to computing device 110 via network 116, such that computing device 110 may output at least a portion of the information provided by ISS 117 to a user.

Network 116 represents any public or private communications network, for instance, cellular, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and remote computing devices 118. Computing device 110, ISS 117, and remote computing devices 118 may send and receive data via network 116 using any suitable communication techniques. Computing device 110, ISS 117, and remote computing devices 118 may send and receive data via different types of networks 116. For example, ISS 117 may exchange data with computing device 110 via a cellular network and computing device 110 may exchange data with remote computing device 118 via Wi-Fi.

Computing device 110, ISS 117, and remote computing device 118 may each be operatively coupled to network 116 using respective network links 104, 105, and 106. Computing device 110, ISS 117, and remote computing device 118 may be operatively coupled to network 116 using different network links. The links coupling computing device 110, ISS 117, and remote computing device 118 to network 116 may be Ethernet, ATM or other types of network connections, and such connections may be wireless and/or wired connections.

Computing device 110 may represent a mobile device, such as a smart phone, a tablet computer, a laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, vehicle cockpit displays, or any other types of wearable and non-wearable, mobile or non-mobile computing devices that may access a digital distribution platform for downloading executable software applications that execute at computing device 110.

Computing device 110 includes a display device, such as a presence-sensitive display (PSD) 112, user interface (UI) module 120 and one or more application modules 124A-N (collectively, "application modules 124"). Modules 120 and 124 may perform operations described using software, hardware, firmware, or a mixture of hardware, software, and firmware residing in and/or executing at computing device 110. Computing device 110 may execute modules 120 and 124 with one or multiple processors or multiple devices. Computing device 110 may execute modules 120 and 124 as virtual machines executing on underlying hardware. Modules 120 and 124 may execute as one or more services of an operating system or computing platform. Modules 120, 122, and 124 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may receive tactile input from a user of respective computing device 110. PSD 112 may receive indications of tactile input by detecting one or more gestures from a user (e.g., the user touching or pointing to one or more locations of PSD 112 with a finger or a stylus pen). PSD 112 may output information to a user as a user interface (e.g., user interface 114, which may be associated with functionality provided by computing device 110. For example, PSD 112 may present various user interfaces related to an application or other features of computing platforms, operating systems, applications, and/or services executing at or accessible from computing device 110.

UI module 120 manages user interactions with PSD 112 and other components of computing device 110. For example, UI module 120 may output a user interface and may cause PSD 112 to display the user interface as a user of computing device 110 views output and/or provides input at PSD 112. UI module 120 may receive one or more indications of input from a user as the user interacts with the user interfaces (e.g., PSD 112). UI module 120 may interpret inputs detected at PSD 112 and may relay information about the detected inputs to one or more associated platforms, operating systems, applications, and/or services executing at computing device 110, for example, to cause computing device 110 to perform functions. For instance, UI module 120 may cause PSD 112 to present user interface 114.

UI module 120 may receive information and instructions from one or more associated platforms, operating systems, applications, and/or services executing at computing device 110 and/or one or more external computing systems (e.g., ISS 117). In addition, UI module 120 may act as an intermediary between the one or more associated platforms, operating systems, applications, and/or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

Application modules 124 represent various individual applications and services that may be executed at computing device 110. One or more application modules 124 may receive an indication of user input selecting a graphical element of a user interface (e.g., graphical user interface 114) associated with a particular application module 124, and may cause computing device 110 to perform a function in response to receiving the indication of user input. Examples of application modules 124 include a mapping or navigation application, a calendar application, an assistant or prediction engine, a search application, a transportation service application (e.g., a bus or train tracking application), a social media application, a game application, an e-mail application, a messaging application, an Internet browser application, or any other applications that may execute at computing device 110. In some examples, one or more application modules 124 may be installed at computing device 110 during production, testing, or otherwise at the time computing device 110 is manufactured and prior to being delivered to a user (e.g., consumer). In some examples, one or more application modules 124 may be installed by a user of computing device 110 after delivery to the user. For example, a user of computing device 110 may interact with ISS 117 to cause computing device 110 to download and install one or more application modules 124.

PSD 112 may output a graphical user interface (GUI) that includes a respective indication of one or more applications installed at computing device 110. For example, PSD 112 may output a graphical user interface that includes one or more icons associated with one or more respective application modules 124. Computing device 110 may receive a user input to select one of the icons associated with a particular application module of application modules 124 (e.g., application module 124A). UI module 120 may detect the user input, determine that the user input corresponds to a location of PSD 112 that corresponds to application module 124A, and may cause computing device 110 to execute the particular application module 124A.

Responsive to executing application module 124A, application module 124A may output a graphical user interface indicative of one or more features of application module 124A. In some examples, the graphical user interface may include a graphical element indicative of application settings associated with the application module 124A. For example, an email application module 124A may output a graphical user interface that includes a plurality of different graphical elements representative of a plurality of respective options, such as "Inbox", "Contacts", "Settings", and/or other options associated with the email application module 124A. As another example, an assistant application module 124A may output a graphical user interface that include graphical elements representative of options such as "News", "Traffic", "Weather", "Settings", and/or other options associated with various features of the assistant application. PSD 112 may detect a user input selecting the graphical element associated with the application settings. In response to detecting the user input, UI module 120 may output an indication of the selection of application settings to the application module 124A.

Application module 124A may include a plurality of application settings associated with the application module 124A and a plurality of settings categories within the application settings. In some examples, a settings category includes one or more related settings within the application settings. For example, application module 124A (e.g., an assistant application) may include categories entitled "Locations", "People", "Productivity", or any other grouping of related settings within the application settings associated with the particular application module 124A. Each settings category may include one or more subcategories. In some examples, a subcategory may include one or more settings that are more closely related to one another. For example, a settings category entitled "People" may include subcategories such as "Musicians", "Athletes", "Actors", etc.

Responsive to receiving the indication of the selection of application settings from module 120, application module 124A may determine a relevancy score corresponding to a particular settings category from the plurality of settings categories. The relevancy score corresponding to a particular settings category may be indicative of a probability that a user will select the corresponding settings category. In some examples, application module 124A may determine the relevancy score based on usage of the settings category. In other words, the relevancy score may be based on how much a user of application module 124A uses (e.g., selects and/or edits settings within) the settings category. Thus, application module 124A may predict which application settings categories a user is most likely to select based on historical usage information.

In some examples, application module 124A may determine a respective relevancy score for a corresponding settings category based at least in part on a respective amount of usage of at least one feature associated with the corresponding settings category. For example, application module 124A may include one or more features associated with a particular settings category. For instance, application module 124A may include a settings category entitled "Places" and a navigation feature that provides a user with navigation instructions to various locations (e.g., to an address specified in the "Places" settings category). Similarly, application module 124A may include a settings category entitled "Sports" and a feature that provides a user with news about sports teams for which the user has indicated an interest. Application module 124A may determine the relevancy score for a particular settings category based on how much a user utilizes one of the features associated with the settings category.

In some examples, application module 124A may maintain historical usage information associated with the settings categories. Application module 124A may only store information associated with a user of application module 124A if the user affirmatively consents to such collection of information. Application module 124A may further provide opportunities for the user to withdraw consent and in which case, the application module 124A may cease collecting or otherwise retaining the information associated with that particular user. Application module 124A may store the historical usage information in any number of different data structures, such as a file, database, or other data structure.

In some examples, the historical usage information may include information about how often a particular settings category is used. A settings category may be "used" when the settings category is selected and/or when the settings in the particular settings category are edited by a user of the application module 124A. For instance, the historical usage information may include a counter for each settings category that indicates how many times a respective settings category has been used within a predefined amount of time. The historical usage information may include an entry for each time that a settings category was selected and/or the settings within the settings category were edited by a user of the application module 124A. For example, the historical usage information may include a timestamp (e.g., date and time) for each time a settings category was used. In some examples, the historical usage information includes usage information for a predefined time period (e.g., one week, one month, one year, etc.) and/or usage information for a predefined number of times a settings category was used. For example, the historical usage information may include a timestamp for each time a settings category has been used in the last two months or a timestamp for each of the previous 100 times a settings category has been used.

Application module 124A may determine a relevancy score associated corresponding to a particular settings category based on the historical usage information. Application module 124A may increase the relevancy score the more a user selects the corresponding settings category, the more a user edits the settings within the corresponding settings category, or both. For example, application module 124A may determine that a particular settings category (e.g., "People") has been edited many times within a particular time period (e.g., the last three months) and may assign a high relevancy score (e.g., 90 out of 100). In contrast, application module 124A may determine that another settings category (e.g., "Finance") has been edited relatively few times within the particular time period and may assign a lower relevancy score (e.g., 10 out of 100).

In some examples, application module 124A may determine the relevancy score based on a number of times the particular category was used and a frequency of usage of the particular settings category. For example, application module 124A may weigh a number of times the corresponding settings category is used by a first weighting factor, weighing a frequency of use by a second weighting factor, and summing the weighted values. The weighting factors may be the same. In some examples, the weighting factors may be different. For example, application module 224A may weigh the frequency of use more heavily than the number of times the settings category is used because a user may be more likely to edit settings the user has previously edited regularly even if that settings category is not edited as many times as the settings within another settings category. In some instances, application module 124A may determine that the "People" settings category was edited 30 times within a particular time period (e.g., three months), but has not been edited within the last two months. For instance, a user may have edited the "People" settings many times the first time the application module 124A was executed but may not have edited those settings since. As another example, application module 124A may determine that the "Finance" settings category has been edited twelve times within the last three months, but is edited once per week. For instance, a user may edit a list of stocks that the user follows once per week. Application module 124A may weigh the number of times the settings in each settings category are used and frequency of usage and may assign a higher relevancy score to the "Finance" settings category. In some examples, application module 124A may determine that the respective relevancy score corresponding to the settings categories entitled "People", "Finance", "Sports", "Weather" and "Places" are 90, 80, 75, 55, and 25 out of 100, respectively.

Application module 124A determines a display position for each settings category within an application settings graphical user interface (e.g., within graphical user interface 114). For example, application module 124A may determine whether and where to display a graphical element representative of a respective settings category within the graphical user interface. In some examples, application module 124A determines the display position of each settings category based on the relevancy score of the corresponding settings category. For example, application module 124A may determine that the settings categories with the highest relevancy scores should be displayed as part of graphical user interface 114. For instance, application module 124A may determine to display the settings category with the highest relevancy score (e.g., "People") at the top of graphical user interface 114, the settings category with the second highest relevancy score (e.g., "Finance") beneath the highest ranked settings category, and so on. In other words, application module 124A may determine the display position for each settings category in descending order of relevancy score, such that settings categories with higher relevancy scores are displayed closer to the top of graphical user interface 114.

In some examples, application module 124A determines the display position of the settings categories based on a default display position. For example, application module 124A may determine to display the settings categories in alphabetical order. As another example, the respective display positions of each settings category may be preprogrammed by an application developer. In some examples, the default display position may be based on one or more users who are similar to the user of computing device 110.

Responsive to determining the display position of each settings category, application module 124A generates the application settings graphical user interface (e.g. within graphical user interface 114) including a respective representation of at least one settings category in the plurality of settings categories at the corresponding display position. Graphical user interface 114 may include a plurality of display regions, such as a "View Indicator" region 130 and a "Settings Region" 150. View indicator region 130 may include a plurality of graphical elements 132 and 134 to indicate whether the settings categories are displayed in a custom arrangement or are displayed in a default arrangement. For instance, custom arrangement graphical element 132 may include a text label such as "Custom View" that indicates the settings categories are displayed in a custom arrangement. Default arrangement graphical element 134 may include a label such as "Default View" to indicate the settings categories are displayed in a default position.

Settings region 150 of graphical user interface 114 may include a plurality of graphical elements 152, 154, 156, and 158 of the application settings graphical user interface. In some examples, each graphical element 152, 154, 156 corresponds to, or is a representation of, a respective settings category. For example, graphical elements 152, 154, and 156 correspond to the settings category entitled "People," "Finance," and "Sports," respectively. Graphical elements 152, 154, and 156 may include a text label corresponding to the title of the respective settings category (e.g., People, Finance, and Sports). One or more of graphical elements 152, 154, and 156 may include subcategories. For instance, graphical element 152 may include one or more names of people the user has indicated an interest in. Similarly, graphical element 154 may indicate one or more ticker symbols of stocks, and graphical element 156 may indicate one or more sports teams. Additional categories graphical element 158 may be indicative of a collection of additional settings categories. For example, additional categories graphical element 158 may include a label such as "More." in response to receiving a user input selecting additional categories graphical element 158, application module 124A may update graphical user interface 114 to include graphical elements corresponding to one or more settings categories that are not initially included in graphical user interface 114. For instance, because the relevancy scores corresponding to settings categories "Weather" and "Places" were too low to be included in graphical user interface 114, application module 124A may update graphical user interface 114 to include graphical elements for each of the "Weather" and "Places" categories in response to receiving a user input selecting additional categories graphical element 158.

In some examples, application module 124A may generate graphical user interface 114 based on the determined, customized display positions. In other words, in response to receiving an indication of user input to view application settings, application module 124A may determine to customize the display positions for graphical elements 152-156 and may generate graphical user interface 114 such that the custom arrangement graphical element 132 is selected and the settings categories are displayed in a custom arrangement. In some examples, application module 124A may generate a graphical user interface based on a default arrangement of the settings categories. For example, application module 124A may receive an indication of user input selecting default arrangement graphical element 134 associated with the default arrangement. In response to receiving the indication of user input selecting default arrangement graphical element 134, application module 124A may update graphical user interface 114 such that the settings categories are displayed according to the default arrangement.

Responsive to generating the application settings graphical user interface, application module outputs an indication of the application settings graphical user interface for display at a display device. For example, application module 124A may output the indication of the application settings graphical user interface 114 to UI module 120. In other words, application module 124A may output data indicative of the application settings graphical user interface 114. UI module 120 may receive the indication of the application settings graphical user interface and may cause PSD 112 to display graphical user interface 114.

Techniques of this disclosure may enable an application to predict which settings categories are most likely to be selected by a user of the application and output a graphical representation of the predicted settings categories at more prominent locations of a graphical user interface. By displaying the predicted settings categories at more prominent locations of the graphical user interface, the application may enable a user to find the settings categories which are most likely to be of interest to the user more quickly and without the need to manually browse through all the settings and select the settings of interest each time the user accesses the application. This helps to simplify the user interface. Such simplification is particularly useful and beneficial on computing devices, such as mobile or portable devices, that typically have limited display size and/or user interaction. Enabling a user to find a particular settings category more quickly may reduce the number of inputs received and reduce the time a display is turned on, which may reduce the power consumed by the computing device and may increase the battery life of the computing device.

Figure 2:
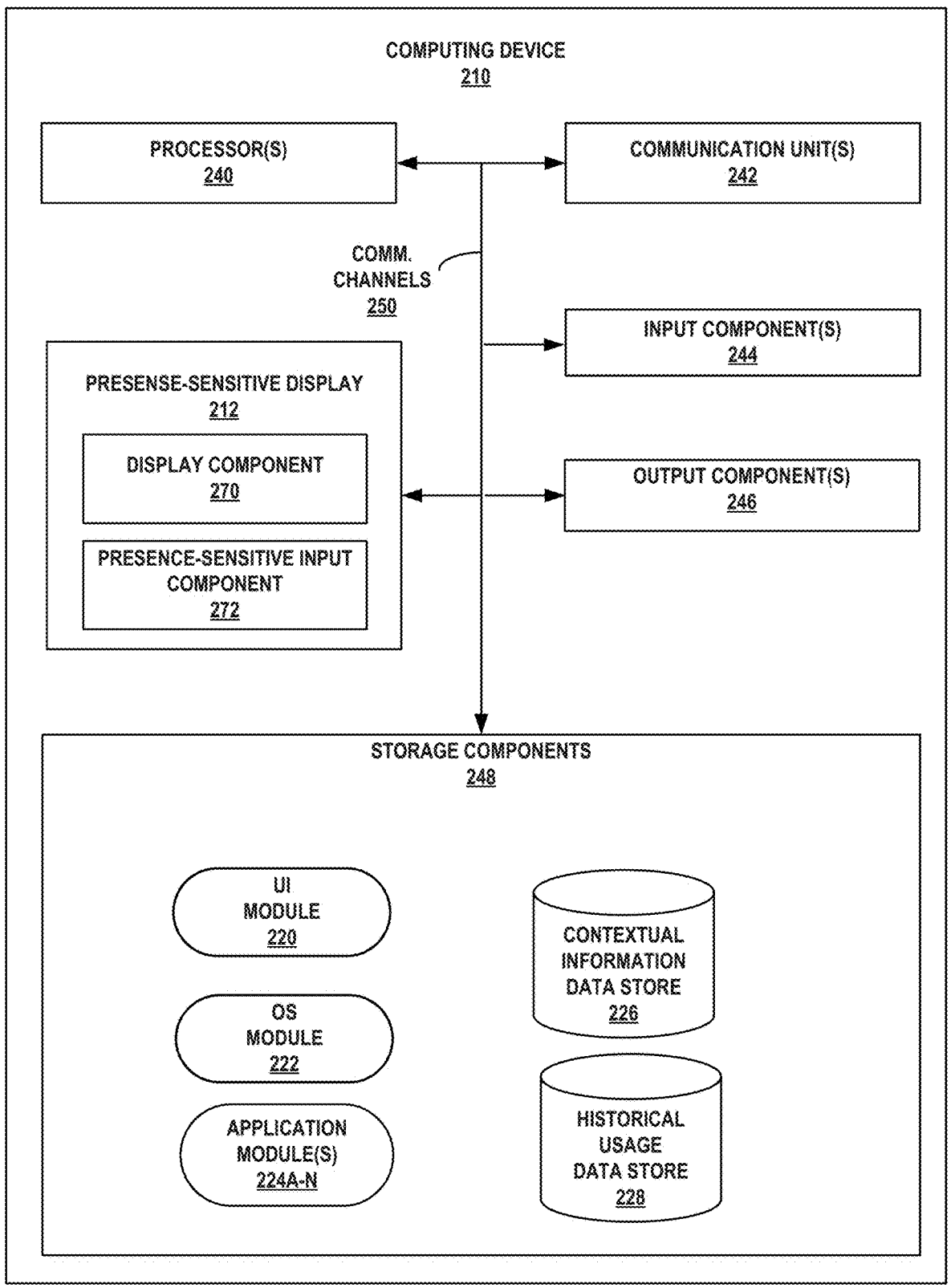
FIG. 2 is a block diagram illustrating an example computing device that is configured to dynamically generate and display customized groups of application settings, in accordance with one or more aspects of the present disclosure.

FIG. 2 is a block diagram illustrating an example computing device that is configured to dynamically generate and display customized groups of application settings, in accordance with one or more aspects of the present disclosure. Computing device 210 of FIG. 2 is described below as an example of computing device 110 illustrated in FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes a display device, such as PSD 212, one or more processors 240, and memory, such as one or more storage components 248. The computing device 20 may also include one or more communication units 242, one or more input components 244, and one or more output components 246. PSD 212 includes display component 270 and presence-sensitive input component 272. Storage components 248 of computing device 210 may include UI module 220, operating system (OS) module 222, one or more application modules 224A-N (collectively, "application modules 224"), contextual information data store 226, and historical usage data store 228.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive display, touch-sensitive screen, mouse, keyboard, voice responsive system, video camera, microphone, or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output. Examples of output are tactile, audio, and video output. Output components 246 of computing device 210 may include a presence-sensitive display, sound card, video graphics adapter card, speaker, cathode ray tube (CRT) monitor, liquid crystal display (LCD), or any other type of device for generating output to a human or machine.

PSD 212 of computing device 210 includes display component 270 and presence-sensitive input component 272. Display component 270 may be a screen at which information is displayed by PSD 212. Presence-sensitive input component 272 may detect an object at and/or near display component 270. As one example range, presence-sensitive input component 272 may detect an object, such as a finger or stylus that is within two inches or less of display component 270. Presence-sensitive input component 272 may determine a location (e.g., an (x,y) coordinate) of display component 270 at which the object was detected. In another example range, presence-sensitive input component 272 may detect an object six inches or less from display component 270 and other ranges are also possible. Presence-sensitive input component 272 may determine the location of display component 270 selected by a user's finger using capacitive, inductive, and/or optical recognition techniques.

In some examples, presence-sensitive input component 272 also provides output to a user using tactile, audio, or video stimuli as described with respect to display component 270. In the example of FIG. 2, PSD 212 displays a graphical user interface. While illustrated as an internal component of computing device 210, PSD 212 may also represent an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging of computing device 210 (e.g., a monitor, a projector, etc. that shares a wired and/or wireless data path with a tablet computer).

One or more processors 240 may implement functionality and/or execute instructions within computing device 210. For example, processors 240 on computing device 210 may receive and execute instructions stored by storage components 248 that execute the functionality of modules 220, 222, and 224. The instructions executed by processors 240 may cause computing device 210 to store information within storage components 248 during program execution. Examples of processors 240 include application processors, display controllers, sensor hubs, and any other hardware configure to function as a processing unit. Modules 220, 222, and 224 may be operable by processors 240 to perform various actions, operations, or functions of computing device 210. For examples, processors 240 of computing device 210 may retrieve and execute instructions stored by storage components 248 that cause processors 240 to perform the operations of modules 220, 222, and 224. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, and 224 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, and 224, as well as data stores 226 and 228.

UI module 220 may include the functionality of UI module 120 of computing device 110 of FIG. 1 and may perform similar operations as UI module 120. For example, UI module 220 of computing device 210 may receive information from application modules 224 that includes instructions for outputting (e.g., displaying or playing audio) a graphical user interface (e.g., user interface 114 of FIG. 1). UI module 220 may receive the information from application modules 224 over communication channels 250 and use the data to generate a user interface. UI module 220 may transmit a user interface and associated data over communication channels 250 to cause PSD 212 to display the user interface at PSD 212.

In some examples, UI module 220 may receive an indication of one or more user inputs detected at PSD 212 and may output information about the user inputs to application modules 224. For example, PSD 212 may detect a user input (e.g., voice or touch input) from a user and send data about the user input to UI module 220. In some instances, UI module 220 may receive the data about the user input and may output an indication of the user input to application modules 224.

Application modules 224 may include the functionality of application modules 124 of computing device 110 of FIG. 1 and may perform similar operations as application modules 124. Application modules 224 may include application settings that may edited by a user of application modules 224. The application settings may include a plurality of settings categories, or groups of settings that are related to one another as described above with reference to FIG. 1. For example, application module 224A may include an assistant application that includes settings categories such as "People," "Locations," "Sports." "Stocks", or any other group of related settings of settings. As another example, application 224B may include an email application that includes settings categories such as "Security", "Notifications", "Accounts", etc. A settings category may include one or more subcategories. Each settings subcategory may include one or more settings that are more closely related to one another. For example, the category "sports" may include subcategories by sport, such as "football," "hockey," "table tennis", and so on.

In some examples, application module 224A may receive an indication of user input to display application settings associated with application 224A. For example, PSI) 212 may display a graphical user interface that includes a menu with a plurality of drop down options, such as "save", "open", and "settings". PSD 212 may detect a user input selecting a graphical element indicative of the application settings.

Responsive to receiving an indication of user input selecting the application settings, application module 224A may dynamically customize the display of the application settings for a particular user account of computing device 210. For example, computing device 210 may be configured with one or more user accounts, where a particular user account from the one or more configured user accounts may be active when application module 224A is launched. Application module 224A may determine which user account is the active user account and may dynamically customize the display of the application settings for the active user. In other words, application module 224A may determine which settings to display and/or which order to display the application settings. For example, application module 224A may predict which application settings categories a user is most likely to select and may cause PSD 212 to display the most likely settings categories more prominently than other settings categories. In some examples, application module 224A may predict which settings categories a user is most likely to select by determining a relevancy scores corresponding to respective settings categories.

Application module 224A may determine a respective relevancy score corresponding to a particular settings category based on historical usage information, contextual information, or both. Historical usage information and/or contextual information may be stored at computing device 210, ISS 117 of FIG. 1, and/or remote computing devices 118 of FIG. 1. Computing device 110, ISS 117, and/or remote computing device 118 may store historical usage information and contextual information only if the user of computing device 210 affirmatively consents to such collection of information. The computing devices may further provide opportunities for the user to withdraw consent and in which case, the computing devices may cease collecting or otherwise retaining the information associated with that particular user. When computing devices store historical usage information and contextual information associated with individual users or when the information is genericized across multiple users, all personally-identifiable-information such as name, address, telephone number, and/or e-mail address linking the information back to individual people may be removed before being stored. Computing device 210, ISS 117, and/or remote computing device 118 may further encrypt the information to prevent access to any information stored therein.

In some examples, historical usage data store 228 may include one or more files, tables, databases, or other data structures that store historical usage information associated with the settings categories. For example, historical usage data store 228 may include a counter for each settings category that indicates how many times a respective settings category has been used. In some examples, historical usage data store 228 includes, for each time a settings category is used, an entry that includes a timestamp and corresponding settings category identifier associated with the settings category that is used. In some examples, the historical usage information includes usage information for a predefined time period (e.g., one week, one month, one year, etc.) and/or usage information for a predefined number of times a settings category was used. For example, the historical usage information may include a timestamp for each time a settings category has been used in the last two months or a timestamp for each of the previous 100 times a settings category has been used.

Application module 224A may determine the relevancy scores corresponding to a particular settings category based at least in part on the historical usage information. In some examples, application module 224A may determine the relevancy score corresponding to a particular settings category based on the number of times the particular settings category is used, the frequency of which the particular settings category is used, or both. For example, application module 224A may query historical usage data store 228 to determine a number of times a particular settings category is used.

Application module 224A may assign a higher relevancy score as the usage of a particular settings category increases. For example, in response to determining that a settings category labeled "Sports" has been used 10 times within a threshold time period and that a settings category labeled "Finance" has been used 20 times within the same threshold time period, application module 224A may assign a relatively high relevancy score (e.g., 60 out of 100) to the "Finance" settings category and a lower relevancy score e.g., 50 out of 100) to the "Sports" settings category. Similarly, application module 224A module 224A may query historical usage data store 228 to determine a frequency of use for the particular settings category. For example, application module 224A may receive, as a result of querying information data store 228, an indication that the "Finance" settings category is used once a week and that the "Sports" settings category is use once a month. For instance, a user of application module 224A may update the stocks the user tracks once a week, but may only add or subtract a few stocks during each edit. Similarly, a user of application module 224A may update the sports teams the user tracks less frequently than the user updates the stocks, but may add and remove several teams each time the user edits the sports teams.

In some examples, application module 224A may weigh the number of times a particular settings category is used by a first weighting factor and may weigh the frequency of usage for the particular settings category by a second weighting factor. The weighting factors may be equal or may be different. In some examples, the second weighting factor applied to the frequency of usage may be greater than the first weighting factor applied to the number of times the particular settings category is used. For example, a user of application module 224A may edit the settings within a particular settings category many times during a single day (e.g., while setting up application module 224A) and may not edit the settings within that particular settings category for a long time. In contrast, a user of application module 224A may edit a different settings category more frequently but fewer times overall. Thus, by giving less weight to the number of times a settings category is used relative to the weight given to the frequency of use, application module 224A may, in some examples, more accurately predict which settings category the user is more likely to select. In some examples, application module 224A may weigh the number of times a settings category is used more heavily than the frequency of use.

In some examples, application module 224A may determine a respective relevancy score for a corresponding settings category based at least in part on a respective amount of usage of at least one feature associated with the corresponding settings category. For example, application module 224A may include one or more features associated with a particular settings category. For instance, application module 224A may include a settings category entitled "Places" and a navigation feature that provides a user with navigation instrucitons to various locations (e.g., to an address specified in the "Places" settings category). Similarly, application module 224 may include a settings category entitled "Sports" and a feature that provides a user with news about sports teams for which the user has indicated an interest. Application module 224 may determine the relevancy score for a particular settings category based on how much a user utilizes one of the features associated with the settings category.

In some instances, historical usage data store 228 stores historical usage information indicating how much the user utilizes a feature of application module 224A that is associated with a particular settings category. Application module 224A may query historical usage information data store 228 to determine how much the user utilizes the particular feature associated with a particular settings category and may assign a relevancy score to the particular settings category based at least in part on the query results. For example, application module 224A may receive, as a result of the query, an indication that the user utilizes the navigation feature once a week and utilizes the sports news feature every day. In some examples, using a feature more frequently may indicate that the user is more likely to edit settings associated with that feature. As a result, in some examples, application module 224A may assign a relatively high (e.g., 70 out of 100) relevancy score to the "Sports" settings category and a relatively low (e.g., 20 out of 100) relevancy score to the "Places" settings category. In some examples, using a feature more frequently may indicate that the user is satisfied with the feature and is less likely to edit the settings associated with that feature. Thus, in some examples, application module 224A may assign a lower relevancy score to a settings category the more the user utilizes the features associated with that settings category.

Application module 224A may determine the respective relevancy score based at least in part on contextual information. In some examples, contextual information data store 226 may include one or more files, tables, databases, or other data structures that store contextual information. As used throughout the disclosure, the term "contextual information" is used to describe information that can be used by a computing system and/or computing device, such as computing device 210 to define one or more environmental characteristics associated with computing devices and/or users of computing devices. In other words, contextual information represents any data that can be used by a computing device and/or computing system to determine a "user context" indicative of the circumstances that form the experience the user undergoes (e.g., virtual and/or physical) for a particular location at a particular time. Contextual information may include movement and position information. Movement and position information may include past, current, and future physical locations, degrees of movement, magnitudes of change associated with movement, patterns of travel, patterns of movement, elevation, etc. Contextual information may include user activity information, such as purchase histories, Internet browsing histories, search histories (e.g., internet searches, searches of computing device 210, or both), and the like. In some examples, contextual information includes local environmental conditions, such as date, time, weather conditions, traffic conditions, or the like. Contextual information may also include communication information such as information derived from e-mail messages, text messages, voice mail messages or voice conversations, calendar entries, task lists, social media network related information, etc. Contextual information may include any other information about a user or computing device that can support a determination of a user context.

Application module 224A may determine the relevancy scores corresponding to a particular settings category based at least in part on the contextual information. For example, application module 224A may determine the relevancy scores based on local environmental conditions (e.g., day and/or time) and historical usage information. Application module 224A may determine that the current day is a weekday and may query the historical usage data store 228 to determine whether any particular settings categories are used more often on weekdays than other settings categories. For instance, application module 224A may query historical usage data store 228 and may receive, as a result of the query, an indication of the number of times each settings category is used by day of the week. As one example, in response to receiving the query results, application module 224A may determine the current day is a weekday and the settings category "Locations" is used twice as often on weekdays than the category "People." In this example, application module 224A may assign a relatively high relevancy score (e.g., 60 out of 100) to the settings category "Locations" and may assign a relatively low relevancy score (e.g., 30 out of 100) to the settings category "People."

Application module 224A may determine a respective display position for each settings category within an application settings graphical user interface. In other words, application module 224A may determine whether and where to display a graphical element representative of a respective settings category within the graphical user interface. In some examples, application module 224A determines the respective display positions based on a default display position. The default display position may be predetermined (e.g., alphabetical, programmed by an application developer, etc.). As will be described in more detail below, in some examples, the default display position for a particular settings category may be based at least in part on how much other users utilize the particular settings category.

In some examples, application module 224A determines the display position of each settings category based on the relevancy score of the corresponding settings category. For example, application module 224A may determine the display positions are to be in order of highest relevancy score to lowest. That is, application module 224A may determine the settings category with the highest relevancy score should be displayed more prominently than other settings categories (e.g., at the top of a list of settings categories).

Responsive to determining the display position for each category, application module 224A may generate an application settings graphical user interface based on the determined display positions for each category. In other words, application module 224A may generate a graphical user interface corresponding to the settings of application module 224A. For example, as shown in FIG. 1, application module 224A may generate a graphical user interface 114 that includes graphical elements associated with each settings category located at the determined display positions. Application module 224A may output an indication of the application settings graphical user interface to UI module 220.

UI module 220 may receive the indication of the graphical user interface from application module 224A. Responsive to receiving the indication of the graphical user interface, UI module 220 may output the application settings graphical user interface and may cause PSD 212 to display the application settings graphical user interface. After outputting the indication of the application settings graphical user interface, the user may select a settings category, edit one or more settings within the selected settings category, and may exit the application settings.

Application module 224A may, at some time after outputting the application settings graphical user interface and receiving an indication of user input to exit the application settings, receive another indication of user input selecting a graphical element associated with the application settings. In response to receiving the indication of the user input selecting the graphical element associated with the application settings, application module 224A may determine whether to display the settings categories in a default arrangement or in a custom arrangement.

In some examples, application module 224A may determine whether to display the settings categories in a default arrangement or in a custom arrangement based on the amount of time that has elapsed since the application settings were last displayed. In other words, application module 224A may determine whether the amount of elapsed time between outputting the application settings graphical user interface and receiving the latest user input to display the application settings satisfies a threshold amount of time. Application module 224A may store a value that indicates when the application settings were most recently used and/or displayed. In response to receiving a user input to display the application settings, application module 224A may determine the amount of time that has elapsed since the application settings were last displayed and may compare the amount of elapsed time to a threshold amount of time.

Responsive to determining that the amount of elapsed time satisfies (e.g., is greater than or equal to) a threshold amount of time, application module 224A may generate a default arrangement graphical user interface. In other words, application module 224A may generate a graphical user interface that includes the settings categories in the default arrangement, such that the display position for each settings category is a default display position. For instance, if a user has not used the application settings within a threshold amount of time, historical information about how much the user actually uses the application settings may not be as relevant and/or accurate indicators of future usage. As a result, application module 224A may determine default display positions for each settings category.

In some examples, the default display positions may be based on an amount of usage of the application settings by one or more users similar to the active user. The active user may be similar to other users who are a similar age (e.g., plus or minus five years, ten years, etc.), live in a similar location (e.g., same city, state, country, etc), have similar application modules installed on computing device 210, or have other characteristics in common. In some examples, the active user may be similar to other users when computing device 210 includes the same, or similar, application modules as computing device associated with other users. In other words, users may be similar when the computing devices associated with the users include the same, or similar, applications. In some examples, application module 224A may determine the amount of usage by similar users by querying a cloud computing system (e.g., ISS 117 of FIG. 1). ISS 117 may send an indication of the amount of usage by similar users to application module 224A. For instance, application module 224A may receiving an indication that similar users use a particular settings category (e.g., "Sports") more than another settings category ("People"). As a result, application module 224A may determine that, for the default arrangement of settings categories, the default position for the Sports settings category is more prominent than the default position of the "People" people category.

In response to determining the display positions of each settings category in the default arrangement, application module 224A may generate the default arrangement graphical user interface. Application module 224A may output an indication of the default arrangement graphical user interface for display at display component 270. For instance, application module 224A may output an indication of the default arrangement graphical user interface to UI module 220. UI module may receive the indication of the default arrangement graphical user interface corresponding to the application settings. Responsive to receiving the indication of the graphical user interface, UI module 220 may output a graphical user interface for the application settings and may cause PSD 212 to display the application settings graphical user interface with the settings categories display in the default arrangement.

In some examples, OS module 222 may include functionality similar to application module 224A. For example, OS module 222 may dynamically generate groups of OS settings to customize the display of OS settings to the active user. OS module 222 may determine whether to display the OS settings in a default arrangement or in a custom arrangement. For instance, OS module 222 may generate a default arrangement OS graphical user interface if the OS settings have been used less than a threshold number of times (e.g., one, five, ten) or if the OS settings have not been used within a threshold amount of time.

In some examples, OS module 222 may generate a custom arrangement OS graphical user interface based on historical usage information about how much the user utilizes the OS settings, based on contextual information, or both. For example, OS module 222 may assign a respective relevancy score corresponding to each OS settings category from a plurality of OS settings categories. OS module 222 may assign the respective relevancy scores based on the amount of usage of the corresponding OS settings categories. For instance, OS module 222 may assign a higher relevancy score to a particular OS settings category the more the user utilizes the particular OS settings category.

Responsive to determining the respective relevancy scores, OS module 222 may determine a display position for each settings category based on the relevancy scores. For instance, OS module 222 may determine to display OS settings categories corresponding to higher relevancy scores in a more prominent position than OS settings categories corresponding to lower relevancy scores. In response to determining the respective display positions, OS module 222 may generate an OS settings graphical user interface and may cause PSD 212 to the OS settings graphical user interface.

FIGS. 3A-3D are conceptual diagrams illustrating example graphical user interfaces that include custom groups of application settings, in accordance with one or more aspects of the present disclosure. FIGS. 3A-3D are described in the context of computing devices 110 and 210 of FIGS. 1 and 2 respectively.

Figure 3B:
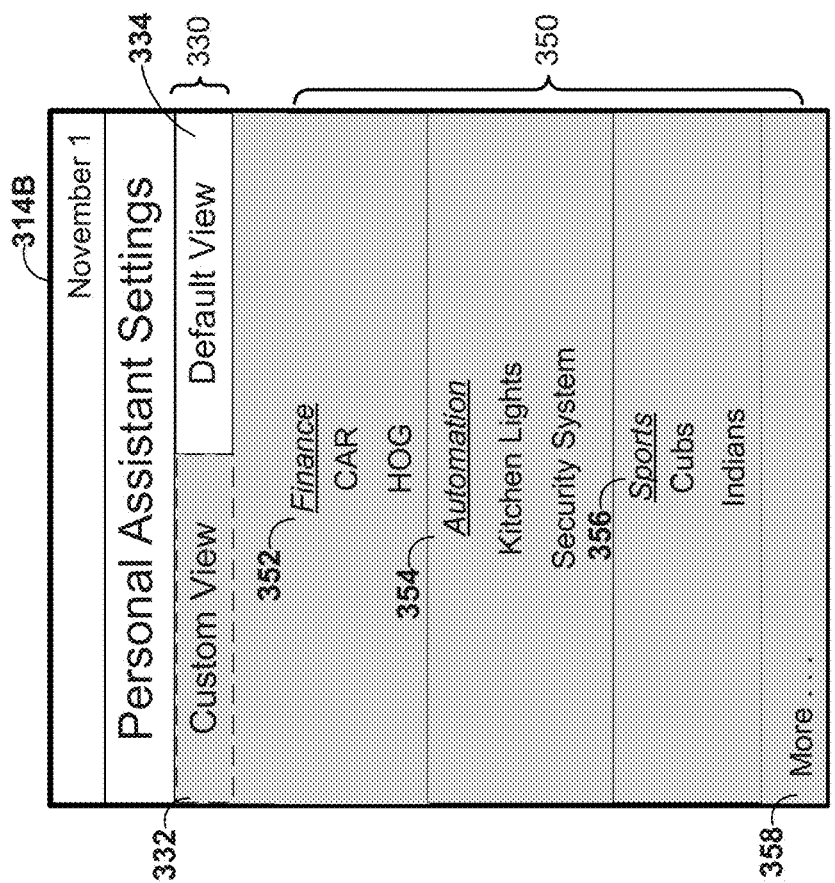
Figure 3A:
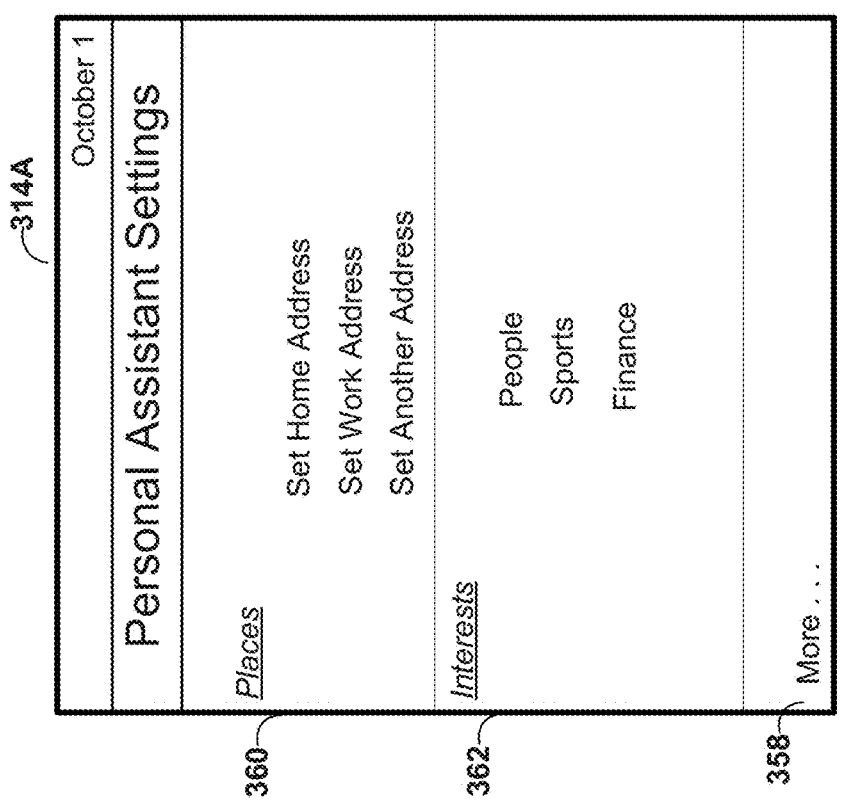

FIG. 3A is a conceptual diagram illustrating an example graphical user interface in which application settings are displayed in a default arrangement. Application module 224A of FIG. 2 may cause PSD 212 to display a graphical user interface 314A that includes application settings in a default arrangement. In some examples, the default arrangement is predetermined. For example, the default arrangement may be set by an application developer. As illustrated in FIG. 3A, graphical user interface 314A includes graphical elements 360 and 362. In some examples, each graphical element 360 and 362 corresponds to a respective settings category. For example, graphical elements 360 and 362 may correspond to settings categories entitled "Places" and "Interests", respectively. For instance, a developer of an assistant application module 224A may set the predetermined display positions for the "Places" and "Interests" settings categories to be more prominent to encourage a user to edit those settings. In some examples, the default arrangement may include an additional categories graphical element 358 that is indicative of additional settings categories. In other words, in the default arrangement, settings categories other than "Places" and "Interests" may not be included in the default arrangement. Thus, in some examples, when application module 224A is executed for the first time, application module 224A may output, to module 220, an indication of graphical user interface 314A that includes the settings categories in the default arrangement. UI module 220 may receive the indication of graphical user interface 314A and may cause PSD 212 to display graphical user interface 314A.

FIG. 3B is a conceptual diagram illustrating an example graphical user interface in which application settings are display in a custom arrangement. In some examples, PSD 212 may cease display graphical user interface 314A (e.g., because computing device ceased executing application module 224A). At some later time, application module 224A may receive an indication of user input to display the application settings again.

Responsive to receiving the indication of user input to display the application settings again, application module 224A may determine whether to cause PSD 212 to display the settings in a default arrangement or whether to customize the display of the settings to the active user. In some examples, application module 224A may determine to arrange the settings categories of the application settings in a default arrangement the first time the settings are used or if the settings have not been used within a threshold amount of time.

Application module 224A may determine whether the amount of elapsed time between receiving the user input to display the application settings and the most recent time the application settings graphical user interface was output satisfies a threshold amount of time. In other words, application module 224A may determine how much time elapsed since last outputting the application settings and determine whether the elapsed time satisfies (e.g., is greater than or equal to) a threshold amount of time. For example, if the application settings were most recently displayed 31 days ago and the threshold amount of time equals 45 days, application module 224A may determine that the amount of elapsed time does not satisfy the threshold amount of time.

In some examples, application module 224A may customize the application settings graphical user interface in response to determining that the amount of elapsed time does not satisfy the threshold amount of time. Application module 224A may customize the application settings graphical user interface to a particular user (e.g., the active user associated with the profile logged into computing device 210 while executing application module 224A) based on a respective relevancy score corresponding to each respective settings category within the application settings. The relevancy score for each respective settings category may indicate a probability that the user is likely to select the respective settings category. In other words, application module 224A may dynamically generate an application settings graphical user interface based on the predicted likelihood that the user will select each settings category within the application settings.

As described with respect to FIGS. 1 and 2, application module 224A may determine the relevancy score corresponding to each respective settings category based on historical usage information of the settings categories, contextual information, or both. For example, application module 224A may assign a higher relevancy score to a particular settings category the more the user utilizes the settings category. In some examples, application module 224A may assign a relevancy based on contextual information such as day, time, location, etc.

Application module 224A may determine a respective display position for each settings category within the application settings based on the relevancy score corresponding to the respective settings category. For example, application module 224A may determine to display the three highest ranked settings categories in descending order. For instance, as illustrated in FIG. 3B, application module 224A may determine that the settings categories with the highest relevancy scores are "Finance," "Automation," and "Sports," and may determine that those settings categories should be displayed in descending order. For example, application module 224A may determine that the settings categories "Finance," "Automation," and "Sports," are to be represented by graphical elements 352, 354, and 356, respectively. In some examples, application module 224A may determine not to display the other settings categories (e.g., Places, People, etc.) in the application settings graphical user interface. In other words, the other settings categories are not represented in graphical user interface 314B by individual graphical elements. Rather, additional categories graphical element 358 may represent the other settings categories. Thus, if the application module 224A receives a user input to select the additional categories graphical element 358, application module 224A may update graphical user interface 314B to include respective graphical elements representative of the other settings categories not originally displayed within graphical user interface 314B.

In some examples, graphical user interface 314B may include "View Indicator" region 330 that includes graphical element 332 and 334 that indicate whether the settings categories are display in a default arrangement or in a custom arrangement. For instance, as illustrated in FIG. 3B, "Custom View" graphical element 332 may indicate that the application settings are currently arranged in a custom arrangement. In some examples, in response to receiving a user input selecting "default view" graphical element 334, application module 224A may update graphical user interface 314B to display the settings categories according to the default arrangement.

Responsive to determining the display positions of each settings category (e.g., the custom display positions based on the relevancy scores), application module 224A may generate graphical user interface 314B and may output an indication of graphical user interface 314B to UI module 220. UI module 220 may receive the indication of graphical user interface 314B and may cause display component 270 to display graphical user interface 314B.

FIG. 3C is a conceptual diagram illustrating an example graphical user interface in which application settings are display in a custom arrangement. In some examples, PSD 212 may cease display graphical user interface 314B (e.g., because computing device ceased executing application module 224A). At some later time, application module 224A may receive an indication of user input to display the application settings a third time.

Responsive to receiving the indication of user input to display the application settings a third time, application module 224A may determine whether to cause PSD 212 to display the settings in a default arrangement or whether to customize the display of the settings to the active user. Application module 224A may determine that the elapsed time since the application settings were most recently displayed equals 30 days and the elapsed time does not satisfy the threshold amount of time, such that application module 224A should customize the display of the application settings.

Application module 224A may determine updated relevancy scores corresponding to each of the settings categories. In some examples, application module 224A may determine, based on the historical usage information in historical usage data store 228, that the user has used the "Finance" settings category the most within a particular time frame (e.g., by updating the ticker symbols the user follows) and has used the "Sports" settings category the second most within the particular time frame (e.g., by updating the sports teams the user follows). As a result, application module 224A may assign the relatively high relevancy scores to these settings categories. In contrast, application module 224A may determine that the "Automation" settings category has not been used much within the particular time frame (e.g., the user hasn't updated the automation settings since setting up the automation settings) and may assign a low relevancy score to the "Automation" settings category.

In some examples, application module 224A may determine to refrain from outputting an indication of graphical element 356 that represents the "Automation" settings category. For example, application module 224A may be configured to include a predefined number three, four, etc.) of settings categories. Thus, in some examples, if the relevancy score corresponding to a particular settings category is no longer in the top three relevancy scores, application module 224A may refrain from including a graphical element associated with the particular settings category. In some examples, application module 224A may be configured to include graphical elements for settings categories only if the corresponding relevancy score is greater than a threshold relevancy score. Thus, in some examples, if the relevancy score corresponding to a particular settings category does not satisfy (e.g., is less than) the threshold relevancy score, application module 224A may refrain from including the graphical element associated with the particular settings category. For example, application module 224A may determine that the relevancy score corresponding to the "Automation" settings category is less than the threshold relevancy score. As a result, as illustrated in FIG. 3C, application module 224A may refrain from outputting an indication of graphical element 354.

Application module 224A may output an indication of graphical user interface 314C. Graphical user interface 314C may include graphical elements 352 and 356 which are representative of the "Finance" and "Sports" settings categories. Graphical user interface 314C may include an additional categories graphical element 358 (e.g., labeled "More") that is associated with a collection of settings categories, such as the "Automation" settings category, a "Places" settings category, etc.

Application module 224A may output an indication of a notification graphical element 351 that indicates "Automation" settings category is now represented by, and is accessible by, the additional categories graphical element 358. In other words, graphical user interface 314C may include a notification to inform the user the "Automation" settings category has been relegated to the "More" button.

Application module 224A may receive an indication of user input selecting the additional settings graphical element (e.g., "More" button) 358. Responsive to receiving the user input selecting additional settings graphical element 358, application module 224A may update graphical user interface 314C to include graphical element 354 that represents the "Automation" settings category.

FIG. 3D is a conceptual diagram illustrating an example graphical user interface in which application settings are display in a default arrangement. In some examples, PSD 212 may cease display graphical user interface 314C (e.g., because computing device ceased executing application module 224A). At some later time, application module 224A may receive an indication of user input to display the application settings another time.

Responsive to receiving the indication of user input to display the application settings another time, application module 224A may determine whether to cause PSD 212 to display the settings in a default arrangement or whether to customize the display of the settings to the active user. In some examples, application module 224A may determine that the application settings have not been used within a threshold amount of time and may display the settings categories of the application settings in a default arrangement. In other words, application module 224A may generate a graphical user interface that includes the settings categories in the default arrangement, such that the display position for each settings category is a default display position.

In some examples, the default display positions may be based on an amount of usage of the application settings by one or more users similar to the active user, Application module 224A may determine the amount of usage by similar users by querying a cloud computing system (e.g., ISS 117 of FIG. 1). ISS 117 may send an indication of the amount of usage by similar users to application module 224A. For instance, application module 224A may receiving an indication that similar users use (e.g., edit the settings within) the "Alarms," "Sports," and "Travel" settings categories the most. As a result, application module 224A may determine that these settings categories should be displayed more prominently than other settings categories in the default arrangement of settings categories.

In response to determining the display positions of each settings category in the default arrangement, application module 224A may generate the default arrangement graphical user interface 314D. For instance, default arrangement graphical user interface 314D may include graphical elements 364, 356, and 368, which represent the settings categories "Alarms," "Sports", and "Travel," respectively. Application module 224A may output an indication of the default arrangement graphical user interface 314D for display at display component 270. UI module may receive the indication of the default arrangement graphical user interface 314D. Responsive to receiving the indication of the graphical user interface 314D, UI module 220 may output a graphical user interface 314D and may cause PSD 212 to display graphical user interface 314D with the settings categories displayed in the default arrangement.

Figure 4:
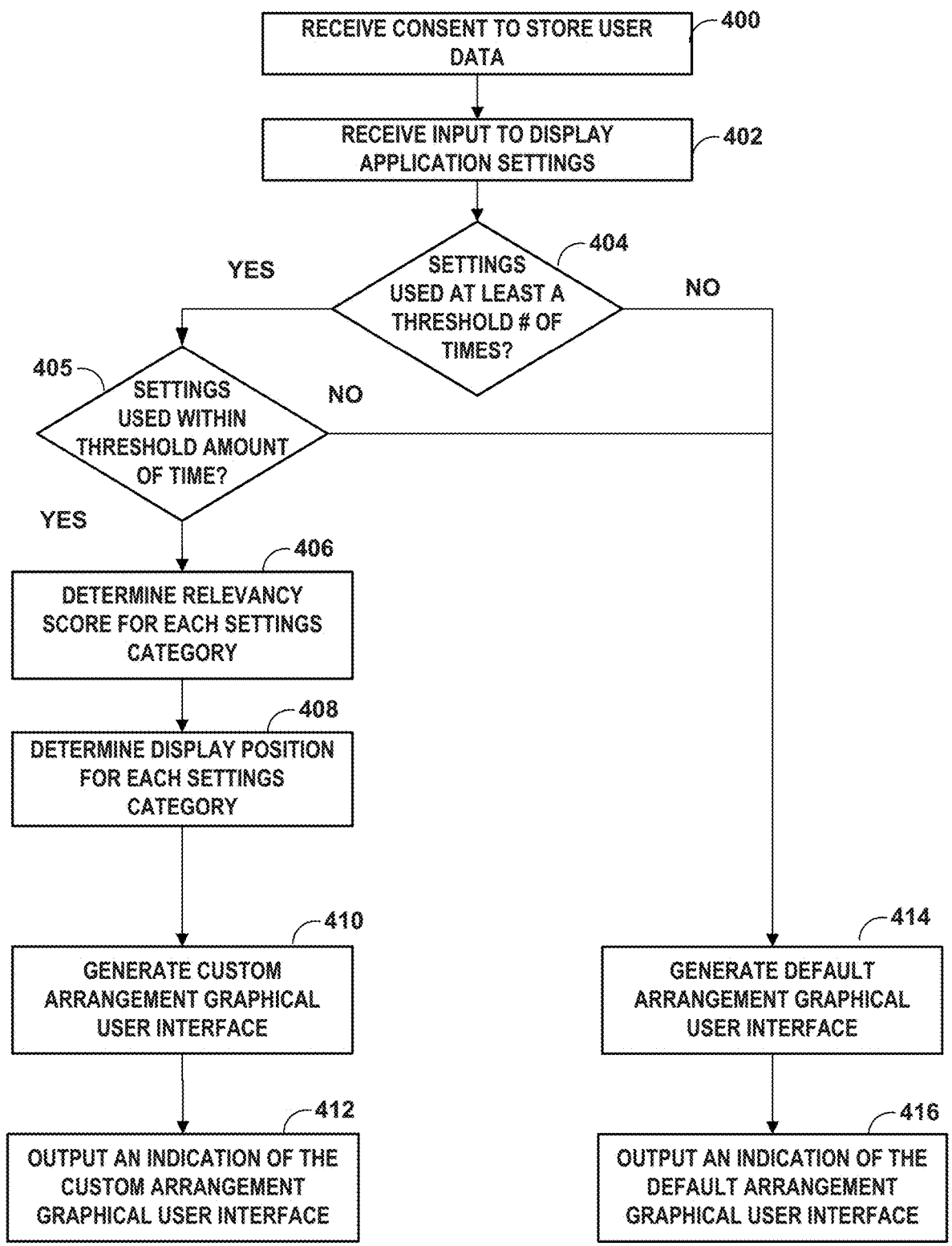
FIG. 4 is a flowchart illustrating example operations of a computing device that is configured to dynamically generate and display customized groups of application settings, in accordance with one or more aspects of the present disclosure.

FIG. 4 is a flowchart illustrating example operations of a computing device that is configured to dynamically generate and display customized groups of application settings, in accordance with one or more aspects of the present disclosure. The process of FIG. 4 may be performed by one or more processors of a computing device, such as computing devices 110 and 210 as illustrated in FIG. 1 and FIG. 2, respectively. For purposes of illustration only, FIG. 4 is described below within the context of computing device 110 and 210 of FIG. 1 and FIG. 2, respectively.

Application module 224A of computing device 210 may receive user consent to store user data (400). Application module 224A may only store information associated with a user of application module 224A if the users affirmatively consents to such collection of information. Application module 224A may further provide opportunities for the user to withdraw consent and in which case, the application module 224A may cease collecting or otherwise retaining the information associated with that particular user. Responsive to receiving user consent to store user data, application module 224A may store contextual information in contextual information data store 226 and historical usage information in historical usage data store 228.

Application module 224A may receive an indication of a user input to display the application settings associated with application module 224A (402). For example, display component 270 of computing device 210 may display a graphical user interface associated with application module 2241. The graphical user interface may include an application settings graphical element corresponding to the application settings of application module 224A. Presence-sensitive display component 272 of computing device 210 may detect a user input selecting application module 224A may output an indication of a graphical user interface associated with the application settings graphical element, UI module 220 of computing device 210 may output an indication of the user input selecting the application settings graphical element, which may be received by application module 224A.

Responsive to receiving the indication of user input selecting the application settings graphical element, application module 224A may determine whether to display the settings categories of the application settings in a default arrangement or in a custom arrangement. For example, application module 224A may determine whether the application settings have been used at least a threshold number (e.g., one, ten, fifty, etc.) of times (404) by querying historical usage data store 228 and may determine to display the settings categories of the application settings in a default arrangement if the application settings have been used less than a threshold number of times. For example, application module 224A may determine to display the settings categories of the application settings in a default arrangement the first time the application settings are displayed.

In some examples, application module 224A may determine whether the application settings were used within a threshold amount of time (405) in response to determining that the application settings have been used at least a threshold number of times ("YES" branch of 404). In other words, application module 224A may determine the amount of elapsed time between outputting the application settings graphical user interface and receiving the latest user input to display the application settings, and may determine whether the amount of elapsed time satisfies a threshold amount of time. For example, application module 224A may query historical usage data store 228 to determine when the application settings were last displayed (e.g., which may correspond to the most recent time the application settings were selected and/or one or more settings within the application settings were edited).

Responsive to determining that the amount of elapsed time does not satisfy (e.g., is less than) a threshold amount of time, application module 224A may generate a default arrangement graphical user interface. In other words, if the settings were most recently used within a threshold amount of time ("YES" branch of 405), application module 224A may determine to customize the arrangement of the settings categories for the application settings.

Application module 224A may determine a respective relevancy score corresponding to one or more respective settings categories as described above. Each respective relevancy score may indicate a probability that a user will select the corresponding settings category. Application module 224A may determine the relevancy scores based on the historical usage information, contextual information, or both. In some examples, the historical usage information includes information about the number of times each settings category is used and/or how often each settings category is used. The historical information may include information about how much (e.g., number of times and/or frequency of usage) a particular feature of application module 224A is used by the user, where the particular feature is associated with one of the settings categories. In some examples, application module 224A may assign a higher relevancy score to a corresponding settings category the more the settings category is used, the more a feature associated with the settings category is used, or both.

Application module 224A may determine a display position of each settings category based at least in part on the relevancy score corresponding to the respective settings category (408). For example, application module 224A may determine to display the settings categories with the highest corresponding relevancy score more prominently than settings categories with lower corresponding relevancy scores. For instance, application module 224A may display settings categories with the highest corresponding relevancy scores towards the top of the application settings graphical user interface (e.g., graphical user interface 314C of FIG. 3).

Responsive to determining the display position of each settings category, application module 224A may generate a custom arrangement application settings graphical user interface (410). In other words, application module 224A may generate a graphical user interface 314C that includes a plurality of graphical elements 352, 356 associated with the settings categories corresponding to the highest relevancy scores. In some examples, graphical user interface 314C may include an additional categories graphical element 358 indicative of a collection of additional settings categories (e.g., settings categories with lower corresponding relevancy scores).

Application module 224A may output an indication of the custom arrangement graphical user interface (412). For instance, application module 224A may output an indication of graphical user interface 314C to UI module 220, which may cause display component 270 of PSD 212 to display graphical user interface 314C.

Application module 224A may generate a default arrangement graphical user interface (414) in response to determining the application settings have not been used at least a threshold number of times ("NO" branch of 404). In other words, application module 224A may generate a default arrangement graphical user interface if the amount of elapsed time satisfies (e.g., is greater than or equal to) a threshold amount of time. In some instances, application module 224A may generate a default arrangement graphical user interface (414) in response to determining the application settings have not been used within a threshold amount of time ("NO" branch of 405). In some examples, the display positions of the settings categories in the default graphical user interface may be predetermined (e.g., hard coded by a developer). The display positions of the settings categories in the default graphical user interface may be based on how much other users (e.g., users that are similar to the user of application module 224A) utilize the settings categories of application module 224A. For example, application module 224A may query ISS 117 of FIG. 1 and receive, as a result of the query, an indication of an amount of usage of the settings categories within application module 224A. For instance, application module 224A may receiving an indication that similar users use a particular settings category (e.g., "Sports") more than another settings category ("People"). As a result, application module 224A may determine that, for the default arrangement of settings categories, the default position for the Sports settings category is more prominent than the default position of the "People" people category. Thus, in some instances, application module 224A may generate the default arrangement graphical user interface that includes graphical elements associated with the respective settings categories, where each graphical element is located at the default display position.

Responsive to generating the default arrangement graphical user interface, application module 224A may output an indication of the default arrangement graphical user interface (416), UI module 220 may receive the indication of the default arrangement graphical user interface and may cause PSD 212 to display the default arrangement graphical user interface.

The following numbered examples may illustrate one or more aspects of the disclosure:

Example 1. A method comprising: determining, by an application executing at a computing device, based at least in part on a respective amount of usage of each settings category from a plurality of settings categories, a respective relevancy score for the corresponding settings category, wherein each respective relevancy score is indicative of a probability that a user will select the corresponding settings category; determining, by the application, based on the respective relevancy scores, a respective display position for each settings category within an application settings graphical user interface; responsive to determining a display position of each settings category, generating, by the application, based on the display positions of each settings category, the application settings graphical user interface including a respective representation of at leak one settings category in the plurality of settings categories at the corresponding display position; and outputting, by the application, for display at a display device, an indication of the application settings graphical user interface.

Example 2. The method of example 1, wherein outputting the indication of the application settings graphical user interface comprises outputting the indication of the application settings graphical user interface at a first time, the method further comprising, at a second time: responsive to receiving a user input to display the application settings, determining, by the application, an amount of elapsed time between outputting the indication of the application settings graphical user interface and receiving the user input; responsive to determining that the amount of elapsed time satisfies a threshold amount of time, generating, by the application, a default arrangement graphical user interface that includes the settings categories in the default arrangement; and outputting, by the application, for display at the display device, an indication of the default arrangement graphical user interface.

Example 3. The method of example 2, wherein the default arrangement is based at least in part on an amount of usage of each settings category for a plurality of users of the application.

Example 4, The method of any combination of examples 1-3, wherein determining the respective relevancy score for the corresponding settings category comprises: weighing, by the application, a frequency of usage of the corresponding settings category by a first weighting factor; and weighing, by the application, a number of times the corresponding settings category was used by a second weighting factor.

Example 5. The method of any combination of examples 1-4, wherein determining the respective relevancy score for the corresponding settings category is further based on a respective amount of usage of at least one feature of the application associated with the corresponding settings category.

Example 6. The method of any combination of examples 1-5, wherein the application settings graphical user interface further includes a default arrangement graphical element, the method further comprising: responsive to receiving an indication of a user input selecting the default arrangement graphical element, updating, by the application, the application settings graphical user interface to include the settings categories in the default arrangement.

Example 7. The method of any combination of examples 1-6, wherein outputting the indication of the application settings graphical interface comprises outputting an indication of a first application settings graphical user interface at a first time, and wherein the first application settings graphical user interface includes a first settings category graphical element, the method further comprising, at a second time: determining, by the application, based at least in part on the amount of usage of the first settings category, an updated relevancy score corresponding to the first settings category; determining, by the application, based on the updated relevancy score corresponding to the first settings category, to refrain from outputting an indication of the first settings category graphical element; outputting, by the application, an indication of a second application settings graphical user interface that includes a second graphical element associated with a collection of settings categories; and responsive to receiving a user input to select the second graphical element, updating, by the application, the second application settings graphical user interface to include the first settings category graphical element.

Example 8. The method of example 7, wherein the second application settings graphical user interface further comprises a third graphical element indicating that the first settings category is represented by the second graphical element.

Example 9. A computing device comprising: at least one processor; and a memory comprising instructions that, when executed by the at least one processor, cause the at least one processor to: determine, based at least in part on a respective amount of usage of each settings category from a plurality of settings categories, a respective relevancy score for the corresponding settings category, wherein each respective relevancy score is indicative of a probability that a user will select the corresponding settings category; determine, based on the respective relevancy scores, a respective display position for each settings category within an application settings graphical user interface; responsive to determining a display position of each settings category, generate, based on the display positions of each settings category, the application settings graphical user interface including a respective representation of at least one settings category in the plurality of settings categories at the corresponding display position; and output, for display at a display device, an indication of the application settings graphical user interface.

Example 10. The computing device of example 9, wherein the instructions that cause the at least one processor to output the indication of the application settings graphical user interface cause the at least one processor to output the indication of the application settings graphical user interface at a first time, where the memory comprises additional instructions that, when executed by the at least one processor, cause the at least one processor to: responsive to receiving a user input to display the application settings, determine an amount of elapsed time between outputting the indication of the application settings graphical user interface and receiving the user input; responsive to determining that the amount of elapsed time satisfies a threshold amount of time, generate a default arrangement graphical user interface that includes the settings categories in the default arrangement; and output, for display at the display device, an indication of the default arrangement graphical user interface.

Example 11. The computing device of example 10, wherein the default arrangement is based at least in part on an amount of usage of each settings category for a plurality of users of the application.

Example 12. The computing device of any combination of examples 9-11, wherein the instructions cause the at least one processor to determine the respective relevancy score for the corresponding settings category by at least causing the at least one processor to: weigh a frequency of usage of the corresponding settings category by a first weighting factor; and weigh a number of times the corresponding settings category was used by a second weighting factor.

Example 13. The computing device of any combination of examples 9-12, wherein the instructions that cause the at least one processor to determine the respective relevancy score for the corresponding settings category cause the at least one processor to determine the respective relevancy score further based on a respective amount of usage of at least one feature of the application associated with the corresponding settings category.

Example 14. The computing device of any combination of examples 9-13, wherein the application settings graphical user interface further includes a default arrangement graphical element, wherein the memory comprises additional instructions that, when executed by the at least one processor, cause the at least one processor to: responsive to receiving an indication of a user input selecting the default arrangement graphical element, update, the application settings graphical user interface to include the settings categories in the default arrangement.

Example 15. The computing device of any combination of examples 9-14, wherein outputting the indication of the application settings graphical interface comprises outputting an indication of a first application settings graphical user interface at a first time, wherein the first application settings graphical user interface includes a first settings category graphical element, and wherein the memory comprises additional instructions that, when executed by the at least one processor, cause the at least one processor to: determine, based at least in part on the amount of usage of the first settings category, an updated relevancy score corresponding to the first settings category; determine, based on the updated relevancy score corresponding to the first settings category, to refrain from outputting an indication of the first settings category graphical element; output an indication of a second application settings graphical user interface that includes a second graphical element associated with a collection of settings categories; and responsive to receiving a user input to select the second graphical element, update the second application settings graphical user interface to include the first settings category graphical element.

Example 16. The computing device of example 15, wherein the second application settings graphical user interface further comprises a third graphical element indicating that the first settings category is represented by the second graphical element.

Example 17. A computer-readable storage medium encoded with instructions that, when executed by at least one processor of a computing device, cause the at least one processor to: determine, based at least in part on a respective amount of usage of each settings category from a plurality of settings categories, a respective relevancy score for the corresponding settings category, wherein each respective relevancy score is indicative of a probability that a user will select the corresponding settings category; determine, based on the respective relevancy scores, a respective display position for each settings category within an application settings graphical user interface; responsive to determining a display position of each settings category, generate, based on the display positions of each settings category, the application settings graphical user interface including a respective representation of at least one settings category in the plurality of settings categories at the corresponding display position; and output, for display at a display device, an indication of the application settings graphical user interface.

Example 18. The computer-readable storage medium of example 17, wherein the instructions that cause the at least one processor to output the indication of the application settings graphical user interface cause the at least one processor to output the indication of the application settings graphical user interface at a first time, where the computer-readable storage medium comprises additional instructions that, when executed by the at least one processor, cause the at least one processor to: responsive to receiving a user input to display the application settings, determine an amount of elapsed time between outputting the indication of the application settings graphical user interface and receiving the user input; responsive to determining that the amount of elapsed time satisfies a threshold amount of time, generate a default arrangement graphical user interface that includes the settings categories in the default arrangement; and output, for display at the display device, an indication of the default arrangement graphical user interface.

Example 19. The computer-readable storage medium of any combination of examples 17-18, wherein the application settings graphical user interface further includes a default arrangement graphical element, wherein the computer-readable storage medium comprises additional instructions that cause the at least one processor to: responsive to receiving an indication of a user input selecting the default arrangement graphical element, update, the application settings graphical user interface to include the settings categories in the default arrangement.

Example 20. The computer-readable storage medium of any combination of examples 17-19, wherein outputting the indication of the application settings graphical interface comprises outputting an indication of a first application settings graphical user interface at a first time, wherein the first application settings graphical user interface includes a first settings category graphical element, and wherein the computer-readable storage medium comprises additional instructions that cause the at least one processor to: determine, based at least in part on the amount of usage of the first settings category, an updated relevancy score corresponding to the first settings category; determine, based on the updated relevancy score corresponding to the first settings category, to refrain from outputting an indication of the first settings category graphical element; output an indication of a second application settings graphical user interface that includes a second graphical element associated with a collection of settings categories; and responsive to receiving a user input to select the second graphical element, update the second application settings graphical user interface to include the first settings category graphical element.

Example 21. A system comprising means for determining, based at least in part on a respective amount of usage of each settings category from a plurality of settings categories, a respective relevancy score for the corresponding settings category, wherein each respective relevancy score is indicative of a probability that a user will select the corresponding settings category; means for determining, based on the respective relevancy scores, a respective display position for each settings category within an application settings graphical user interface; responsive to determining a display position of each settings category, means for generating, based on the display positions of each settings category, the application settings graphical user interface including a respective representation of at least one settings category in the plurality of settings categories at the corresponding display position; and means for outputting, for display at a display device, an indication of the application settings graphical user interface.

Example 22. The system of example 21, wherein the means for outputting the indication of the application settings graphical user interface comprises means for outputting the indication of the application settings graphical user interface at a first time, the system further comprising, at a second time: responsive to receiving a user input to display the application settings, means for determining an amount of elapsed time between outputting the indication of the application settings graphical user interface and receiving the user input; responsive to determining that the amount of elapsed time satisfies a threshold amount of time, means for generating a default arrangement graphical user interface that includes the settings categories in the default arrangement; and means for outputting, for display at the display device, an indication of the default arrangement graphical user interface.

Example 23. The system of example 22, wherein the default arrangement is based at least in part on an amount of usage of each settings category for a plurality of users of the application.

Example 24. The system of any combination of examples 21-23, wherein the means for determining the respective relevancy score for the corresponding settings category comprises: means for weighing a frequency of usage of the corresponding settings category by a first weighting factor; and means for weighing a number of times the corresponding settings category was used by a second weighting factor.

Example 25. The method of any combination of examples 21-24, wherein the means for determining the respective relevancy score for the corresponding settings category is further based on a respective amount of usage of at least one feature of the application associated with the corresponding settings category.

Example 26. The method of any combination of examples 21-25, wherein the application settings graphical user interface further includes a default arrangement graphical element, the system further comprising: responsive to receiving an indication of a user input selecting the default arrangement graphical element, means for updating the application settings graphical user interface to include the settings categories in the default arrangement.

Example 27. The system of any combination of examples 21-26, wherein the means for outputting the indication of the application settings graphical interface comprises means for outputting an indication of a first application settings graphical user interface at a first time, and wherein the first application settings graphical user interface includes a first settings category graphical element, the system further comprising, at a second time: means for determining, based at least in part on the amount of usage of the first settings category, an updated relevancy score corresponding to the first settings category; means for determining, based on the updated relevancy score corresponding to the first settings category, to refrain from outputting an indication of the first settings category graphical element; means for outputting an indication of a second application settings graphical user interface that includes a second graphical element associated with a collection of settings categories; and responsive to receiving a user input to select the second graphical element, means for updating the second application settings graphical user interface to include the first settings category graphical element.

Example 28. The system of example 27, wherein the second application settings graphical user interface further comprises a third graphical element indicating that the first settings category is represented by the second graphical element.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by an assistant application executing at a computing device, based at least in part on a respective amount of historical usage of each settings category from a plurality of settings categories for the assistant application, a respective relevancy score for the corresponding settings category, wherein:
      each respective relevancy score is indicative of a probability that a user will select the corresponding settings category, and
      the historical usage is based at least in part on a frequency of:
         prior user selections of settings within each of the settings categories, and
         prior user modifications of the settings within each of the settings categories;
   determining, by the assistant application, based on the respective relevancy scores, a respective display position for each settings category within a custom application settings graphical user interface, wherein the custom application settings graphical user interface is for settings of the assistant application, and wherein the custom application settings graphical user interface is tailored to the user;
   responsive to determining a display position of each settings category, generating, by the assistant application, based on the display positions of each settings category, the custom application settings graphical user interface including a respective representation of at least one settings category in the plurality of settings categories at the corresponding display position;
   responsive to receiving user input to display the settings for the assistant application, outputting, by the assistant application, for display at a display device: the custom application settings graphical user interface that is based on the historical usage of each settings category, and a selectable default settings element in the custom application settings graphical user interface that, when selected, causes a default application settings graphical user interface to supplant the custom application settings graphical user interface, wherein the default application settings graphical user interface is for the settings of the assistant application; and
   in response to selection of the selectable default settings element, supplanting the custom application settings graphical user interface with the default application settings graphical user interface, wherein the default application settings graphical user interface displays the settings categories in a default arrangement, and wherein the default application settings graphical user interface includes a selectable custom settings element that, when selected, causes the custom application settings graphical user interface that is generated by the assistant application based at least on the historical usage of each settings category to supplant the default application settings graphical user interface.

2. The method of claim 1, wherein outputting the custom application settings graphical user interface comprises outputting the custom application settings graphical user interface at a first time, the method further comprising, at a second time:
   responsive to receiving additional user input to display the settings for the assistant application, determining, by the assistant application, an amount of elapsed time between outputting the custom application settings graphical user interface and receiving the additional user input;
responsive to determining that the amount of elapsed time satisfies a threshold amount of time, generating, by the assistant application, the default application settings graphical user interface that includes the settings categories in the default arrangement; and
responsive to receiving the additional user input to display the settings for the assistant application, outputting, by the assistant application, for display at the display device, the default application settings graphical user interface.

3. The method of claim 2, wherein the default arrangement is based at least in part on an amount of historical usage of each settings category for a plurality of users of the assistant application.

4. The method of claim 1, wherein determining the respective relevancy score for the corresponding settings category comprises:
weighing, by the assistant application, a frequency of usage of the corresponding settings category within a particular time period by a first weighting factor; and
weighing, by the assistant application, a number of times the corresponding settings category was used by a second weighting factor.

5. The method of claim 1, wherein determining the respective relevancy score for the corresponding settings category is further based on a respective amount of historical usage of a plurality of features of the assistant application associated with the corresponding settings category.

6. The method of claim 5, wherein a given feature, of the plurality of features of the assistant application associated with the corresponding settings category, includes information derived from at least one of: e-mail messages, purchase histories, or search histories.

7. The method of claim 1, wherein outputting the custom application settings graphical user interface comprises outputting a first application settings graphical user interface at a first time, and wherein the first application settings graphical user interface includes a first settings category graphical element, the method further comprising, at a second time:
determining, by the assistant application, based at least in part on the amount of historical usage of the first settings category, an updated relevancy score corresponding to the first settings category;
determining, by the assistant application, based on the updated relevancy score corresponding to the first settings category, to refrain from outputting the first settings category graphical element;
outputting, by the assistant application, a second application settings graphical user interface that includes a second graphical element associated with a collection of settings categories; and
responsive to receiving additional user input to select the second graphical element, updating, by the assistant application, the second application settings graphical user interface to include the first settings category graphical element.

8. The method of claim 7, wherein the second application settings graphical user interface further comprises a third graphical element indicating that the first settings category is represented by the second graphical element.

9. The method of claim 1, wherein the historical usage is further based at least in part on a number of times each of the setting categories were previously used.

10. A computing device comprising:
at least one processor; and
a memory comprising instructions that, when executed by the at least one processor, cause the at least one processor to:
determine, based at least in part on a respective amount of historical usage of each settings category from a plurality of settings categories for an assistant application, a respective relevancy score for the corresponding settings category, wherein:
each respective relevancy score is indicative of a probability that a user will select the corresponding settings category, and
the historical usage is based at least in part on a frequency of:
prior user selections of settings within each of the settings categories, and
prior user modifications of the settings within each of the settings categories;
determine, based on the respective relevancy scores, a respective display position for each settings category within a custom application settings graphical user interface, wherein the custom application settings graphical user interface is for settings of the assistant application, and wherein the custom application settings graphical user interface is tailored to the user;
responsive to determining a display position of each settings category, generate, based on the display positions of each settings category, the custom application settings graphical user interface including a respective representation of at least one settings category in the plurality of settings categories at the corresponding display position;
responsive to receiving user input to display the settings for the assistant application, output, for display at a display device: the custom application settings graphical user interface that is based on the historical usage of each settings category, and a selectable default settings element in the custom application settings graphical user interface that, when selected, causes a default application settings graphical user interface to supplant the custom application settings graphical user interface, wherein the default application settings graphical user interface is for the settings of the assistant application; and
in response to selection of the selectable default settings element, supplant the custom application settings graphical user interface with the default application settings graphical user interface, wherein the default application settings graphical user interface includes the settings categories in a default arrangement, and wherein the default application settings graphical user interface includes a selectable custom settings element that, when selected, causes the custom application settings graphical user interface that is generated by the assistant application based at least on the historical usage of each settings category to supplant the default application settings graphical user interface.

11. The computing device of claim 10, wherein the instructions that cause the at least one processor to output the custom application settings graphical user interface cause the at least one processor to output the custom application settings graphical user interface at a first time, where the memory comprises additional instructions that, when executed by the at least one processor, cause the at least one processor to:

responsive to receiving additional user input to display the settings for the assistant application, determine an amount of elapsed time between outputting the custom application settings graphical user interface and receiving the additional user input;

responsive to determining that the amount of elapsed time satisfies a threshold amount of time, generate the default application settings graphical user interface that includes the settings categories in the default arrangement; and responsive to receiving the additional user input to display the settings for the assistant application, output, for display at the display device, the default application settings graphical user interface.

12. The computing device of claim 11, wherein the default arrangement is based at least in part on an amount of historical usage of each settings category for a plurality of users of the assistant application.

13. The computing device of claim 10, wherein the instructions cause the at least one processor to determine the respective relevancy score for the corresponding settings category by at least causing the at least one processor to:
weigh a frequency of usage of the corresponding settings category within a particular time period by a first weighting factor; and
weigh a number of times the corresponding settings category was used by a second weighting factor.

14. The computing device of claim 10, wherein the instructions that cause the at least one processor to determine the respective relevancy score for the corresponding settings category cause the at least one processor to determine the respective relevancy score further based on a respective amount of historical usage of a plurality of features of the application associated with the corresponding settings category.

15. The computing device of claim 10, wherein outputting the custom application settings graphical user interface comprises outputting a first application settings graphical user interface at a first time, wherein the first application settings graphical user interface includes a first settings category graphical element, and wherein the memory comprises additional instructions that, when executed by the at least one processor, cause the at least one processor to:
determine, based at least in part on the amount of historical usage of the first settings category, an updated relevancy score corresponding to the first settings category;
determine, based on the updated relevancy score corresponding to the first settings category, to refrain from outputting the first settings category graphical element;
output a second application settings graphical user interface that includes a second graphical element associated with a collection of settings categories; and
responsive to receiving additional user input to select the second graphical element, update the second application settings graphical user interface to include the first settings category graphical element.

16. The computing device of claim 15, wherein the second application settings graphical user interface further comprises a third graphical element indicating that the first settings category is represented by the second graphical element.

17. A non-transitory computer-readable storage medium encoded with instructions that, when executed by at least one processor of a computing device, cause the at least one processor to:

determine, based at least in part on a respective amount of historical usage of each settings category from a plurality of settings categories for an assistant application, a respective relevancy score for the corresponding settings category, wherein:
each respective relevancy score is indicative of a probability that a user will select the corresponding settings category, and
the historical usage is based at least in part on a frequency of:
prior user selections of settings within each of the settings categories, and
prior user modifications of the settings within each of the settings categories;
determine, based on the respective relevancy scores, a respective display position for each settings category within a custom application settings graphical user interface, wherein the custom application settings graphical user interface is for settings of the assistant application, and wherein the custom application settings graphical user interface is tailored to the user;
responsive to determining a display position of each settings category, generate, based on the display positions of each settings category, the custom application settings graphical user interface including a respective representation of at least one settings category in the plurality of settings categories at the corresponding display position;
responsive to receiving user input to display the settings for the assistant application, output, for display at a display device: the custom application settings graphical user interface that is based on the historical usage of each settings category, and a selectable default settings element in the custom application settings graphical user interface that, when selected, causes a default application settings graphical user interface to supplant the custom application settings graphical user interface, wherein the default application settings graphical user interface is for the settings of the assistant application; and
in response to selection of the selectable default settings element, supplant the custom application settings graphical user interface with the default application settings graphical user interface, wherein the default application settings graphical user interface includes the settings categories in a default arrangement, and wherein the default application settings graphical user interface includes a selectable custom settings element that, when selected, causes the custom application settings graphical user interface that is generated by the assistant application based at least on the historical usage of each settings category to supplant the default application settings graphical user interface.

18. The non-transitory computer-readable storage medium of claim 17, wherein the instructions that cause the at least one processor to output the custom application settings graphical user interface cause the at least one processor to output the custom application settings graphical user interface at a first time, where the computer-readable storage medium comprises additional instructions that, when executed by the at least one processor, cause the at least one processor to:
responsive to receiving additional user input to display the settings for the assistant application, determine an amount of elapsed time between outputting the custom application settings graphical user interface and receiving the additional user input;

responsive to determining that the amount of elapsed time satisfies a threshold amount of time, generate the default application settings graphical user interface that includes the settings categories in the default arrangement; and responsive to receiving the additional user input to display the settings for the assistant application, output, for display at the display device, the default application settings graphical user interface.

19. The non-transitory computer-readable storage medium of claim 17, wherein outputting the custom application settings graphical user interface comprises outputting a first application settings graphical user interface at a first time, wherein the first application settings graphical user interface includes a first settings category graphical element, and wherein the computer-readable storage medium comprises additional instructions that cause the at least one processor to:

determine, based at least in part on the amount of historical usage of the first settings category, an updated relevancy score corresponding to the first settings category;

determine, based on the updated relevancy score corresponding to the first settings category, to refrain from outputting the first settings category graphical element;

output a second application settings graphical user interface that includes a second graphical element associated with a collection of settings categories; and responsive to receiving additional user input to select the second graphical element, update the second application settings graphical user interface to include the first settings category graphical element.

\* \* \* \* \*